US007690280B2

(12) United States Patent
Chapelon et al.

(10) Patent No.: US 7,690,280 B2
(45) Date of Patent: *Apr. 6, 2010

(54) TRANSMISSION ELEMENT FOR PARALLEL HYBRID TRACTION CHAIN

(75) Inventors: Lionel Chapelon, Le Mont Saint Adrien (FR); David Pierre, Courbevoie (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 504 days.

This patent is subject to a terminal disclaimer.

(21) Appl. No.: 11/570,029

(22) PCT Filed: May 31, 2005

(86) PCT No.: PCT/FR2005/050394

§ 371 (c)(1),
(2), (4) Date: Dec. 4, 2006

(87) PCT Pub. No.: WO2005/123434

PCT Pub. Date: Dec. 29, 2005

(65) Prior Publication Data

US 2008/0015085 A1    Jan. 17, 2008

(30) Foreign Application Priority Data

Jun. 3, 2004   (FR) .................................. 04 06028

(51) Int. Cl.
*F16H 37/06* (2006.01)
*F16D 25/00* (2006.01)

(52) U.S. Cl. .................. 74/661; 903/912; 903/951; 192/87.11

(58) Field of Classification Search .................. 74/661; 903/951, 912, 914; 310/92, 94; 192/87.11
See application file for complete search history.

(56) References Cited

U.S. PATENT DOCUMENTS 5,691,588 A * 11/1997 Lutz et al. .................. 310/92

(Continued)

FOREIGN PATENT DOCUMENTS

DE    10209514 A1    10/2002

(Continued)

OTHER PUBLICATIONS

International Search Report mailed Oct. 28, 2005 in PCT/FR2005/050394.

*Primary Examiner*—Tisha D Lewis
(74) *Attorney, Agent, or Firm*—Nicolas E. Seckel

(57) ABSTRACT

An element comprises a rotary input member (15), a motion output member (19), an electrical machine (14) including a stator (27) and a rotor (26), a first connecting clutch (89A) between the input member (15) and an intermediate member (83) rotating about a first axis (X-X'). The intermediate member (83) is connected in rotation to the rotor (26), and a second connecting clutch (89B) is positioned between the intermediate member (83) and the output member (19). The element also comprises a casing (21) defining a housing (69) wherein are coaxially and concentrically mounted the first and second connecting clutches (89A, 89B). The axis of rotation (Y-Y') of the rotor (26) is separate from the first axis (X-X') and a transmission (121, 123, 135) connects in rotation the rotor (26) and the intermediate member (83). The invention is applicable to motor vehicle engine-transmission units.

15 Claims, 3 Drawing Sheets

U.S. PATENT DOCUMENTS

| | | | |
|---|---|---|---|
| 5,789,823 A * | 8/1998 | Sherman | 290/47 |
| 5,875,691 A * | 3/1999 | Hata et al. | 74/661 |
| 6,008,545 A * | 12/1999 | Nagano et al. | 290/46 |
| 6,184,603 B1 * | 2/2001 | Hamai et al. | 310/75 R |
| 6,332,257 B1 | 12/2001 | Reed et al. | |
| 6,354,974 B1 * | 3/2002 | Kozarekar | 475/5 |
| 6,371,877 B1 * | 4/2002 | Schroeder et al. | 475/5 |
| 6,655,484 B2 * | 12/2003 | Levin | 180/65.2 |
| 6,746,354 B1 * | 6/2004 | Ziemer | 475/5 |
| 7,293,637 B2 * | 11/2007 | Janson et al. | 192/87.11 |
| 7,479,720 B2 * | 1/2009 | Reisch et al. | 310/88 |
| 2002/0177504 A1 | 11/2002 | Pels et al. | |
| 2003/0217617 A1 * | 11/2003 | Sakamoto et al. | 74/665 B |
| 2004/0055800 A1 | 3/2004 | Katou et al. | |

FOREIGN PATENT DOCUMENTS

| | | |
|---|---|---|
| EP | 1369280 A | 12/2003 |
| EP | 1403117 A2 | 3/2004 |
| FR | 2814121 A1 | 3/2002 |
| WO | WO9922955 A * | 5/1999 |

* cited by examiner

TRANSMISSION ELEMENT FOR PARALLEL HYBRID TRACTION CHAIN

BACKGROUND ART

The present invention concerns a transmission element for a traction chain of the parallel hybrid type, in particular for motor vehicles.

By parallel hybrid traction chain, it is meant a traction chain providing to a wheel shaft a mechanical energy from at least one engine of the "irreversible" type (in general, a thermal engine) and at least one engine of the "reversible" type (in general, an electric motor). In this type of chain, the energy node which comes from these two engines has a mechanical nature.

Such traction chains are known (FR 2 814 121), which comprise a thermal engine, a transmission element, and a gear box, whose input is connected to a transmission element and whose output is connected to a wheel shaft.

The transmission element comprises further an electric motor as well as a first connecting clutch between the thermal engine and the electric motor, and a second connecting clutch between the electric motor and the gear box. The first and second clutches are of the wet type.

SUMMARY OF THE INVENTION

Such hybrid traction chains are not fully satisfactory.

Indeed, the transmission element which integrates the electric motor and the two connecting clutches to the thermal engine and to the gear box, respectively, is not intended to be easily interchangeable with a simple clutch of the type used in the standard thermal engine traction chains.

More precisely, the integration of such a transmission element in a standard traction chain requires shifting the thermal engine and/or the gear box, which causes the modification of numerous parts in the engine compartment.

Taking into account the small number of hybrid drive vehicles produced at present, the cost of these traction chains is consequently extremely high, as compared to the cost of a traction chain of a standard drive engine-transmission unit.

An objective of the invention is thus to propose a transmission element having a small size which can substitute itself for the simple clutch of a standard mono-source traction chain to form a traction chain of the parallel hybrid type, without major modification of the other elements of the traction chain.

An object of the invention is thus a transmission element for a traction chain of the parallel hybrid type, in particular for motor vehicles, said element comprising an input member movable in rotation, intended to be connected to a thermal engine, a movement output member intended to be connected to an input shaft of a gear box, an electrical machine comprising a stator and a rotor, a first connecting clutch between the input member and an intermediate member movable in rotation about a first axis, the intermediate member being connected in rotation to the rotor, a second connecting clutch between the intermediate member and the output member, characterized in that it comprises a casing comprising a first half-shell supporting the input member movable in rotation and a second half-shell, the first and second half-shells defining a housing in which the first and second connecting clutches are mounted coaxially and concentrically, in that the rotation axis of the rotor is distinct from the first axis, and in that the transmission means connect in rotation the rotor and the intermediate member.

According to other characteristics of the invention, taken alone or according to all combinations that are technically possible:

- the rotation axis of the rotor is parallel to said first axis;
- the electrical machine has a shape elongated along the rotation axis of the rotor;
- the electrical machine is outside of said housing and the rotor is integral in rotation with a coupling member in said housing;
- the transmission means comprise a first toothed wheel integral with a radial surface of the coupling member, a second toothed wheel integral with a radial surface of the intermediate member, and a transmission chain which connects the first and second toothed wheels;
- the intermediate member is in the shape of a hub extending perpendicularly to the first axis, this hub comprising, on an upstream face, an external axial ring in rotational linkage with the first clutch, an internal axial ring in rotational linkage with the second clutch, this hub being mounted movable in rotation about the first axis on a distributor fixed to the casing;
- the input member is formed by a disc extending perpendicularly to the first axis, this disc comprising, on an upstream face, an upstream axial ring equipped with flutes for linkage with a damping flywheel connected to the thermal engine, and on a downstream face, a downstream axial ring in rotational linkage with the first clutch;
- the output member is formed by a disc extending perpendicularly to the first axis, this disc comprising, on a downstream face, an internal axial ring equipped with flutes for linkage with a gear box input shaft, and an external axial ring in rotational linkage with the second clutch;
- the input member, the first and second clutches, the intermediate member, and the output member are part of a module arranged as one unit in the housing;
- the first and second clutches are of the wet type, the housing being closed in a sealed manner with respect to a lubrication and cooling fluid;
- the first clutch comprises a first series of discs in rotational linkage with the input member and a second series of discs in rotational linkage with the intermediate member, the discs of this second series being disposed between the discs of the first series, the first and second series of discs being movable in axial translation under the action of an actuating piston disposed in a housing of the intermediate member;
- the second clutch comprises a first series of discs in rotational linkage with the intermediate member and a second series of discs in rotational linkage with the output member, the discs of the second series being disposed between the discs of the first series, the first and second series of discs being movable in axial translation under the action of an actuating piston disposed in a housing of the intermediate member;
- the first and second clutches comprise each a return member in open position of these clutches; and
- it comprises further a hydraulic circuit for selective control of the closing of the first and second clutches.

Another object of the invention is a motor vehicle comprising a traction chain of the parallel hybrid type, said traction chain comprising a thermal engine, a gear box, and a transmission element as described above.

BRIEF DESCRIPTION OF THE DRAWINGS

The invention will be better understood by reading the following description, given as an example and made in reference to the annexed drawings in which.

DETAILED DESCRIPTION OF PARTICULAR EMBODIMENTS

Figure 1:
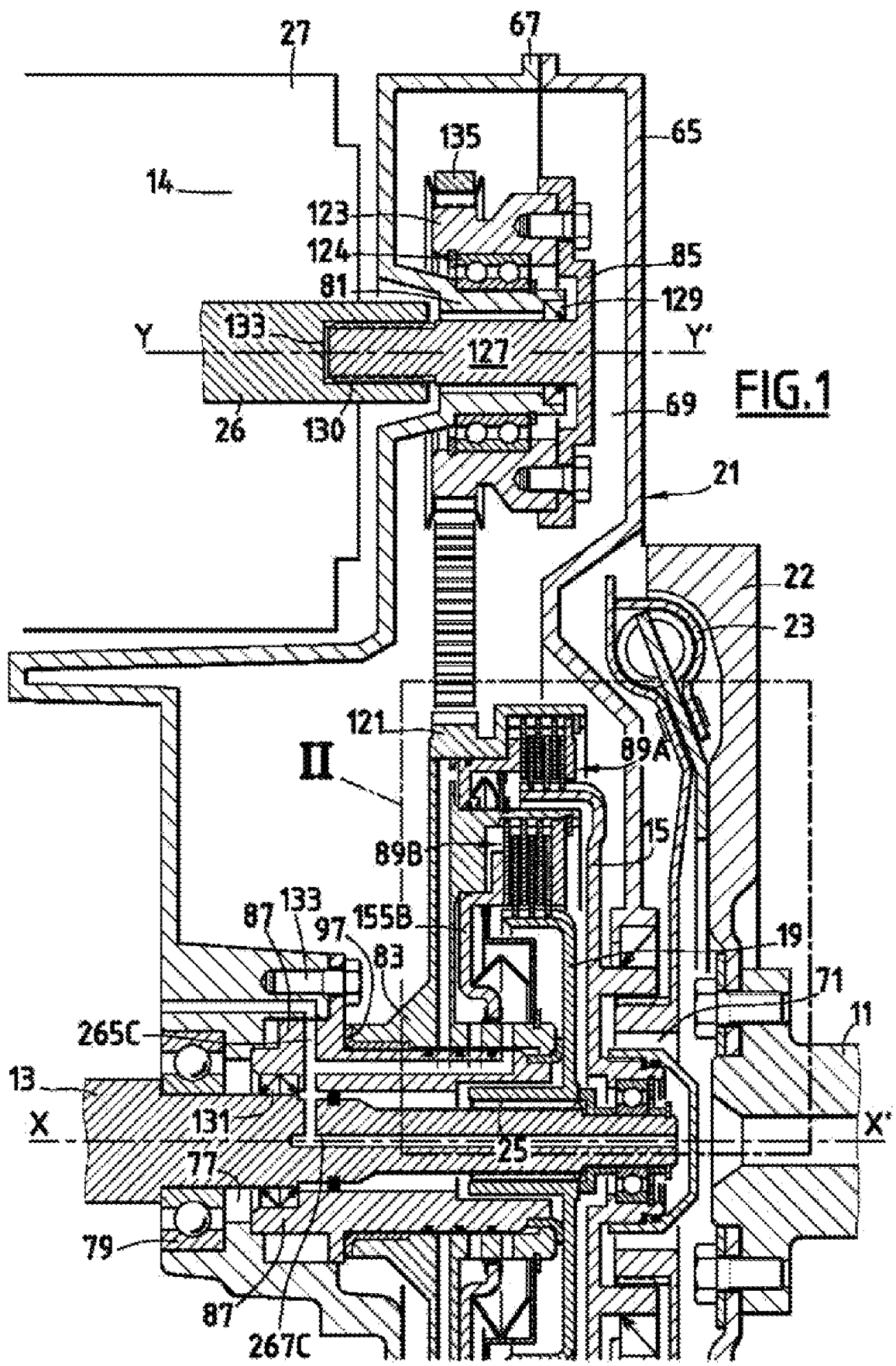
FIG. 1 is a schematic view in axial cross-section of a transmission element according to the invention.

FIG. 1 shows a transmission element according to the invention, intended to connect a crankshaft 11 of a thermal engine to a gear box input shaft 13.

This transmission element comprises an electrical machine 14, an input member 15 movable in rotation about a first axis X-X', a movement output member 19 movable in rotation about the first axis X-X', and a clutch casing 21.

The axis X-X' is oriented from the input toward the output to facilitate the following description.

The terms "upstream," "downstream," "axial," and "radial" will be understood by reference to this orientation.

The crankshaft 11 of the thermal engine is equipped with a flywheel 22, and is connected to the input member 15 by a damping device 23.

The input shaft 13 of the gear box (designated by "primary shaft" or in this text by "gear box shaft") is mounted movable in rotation about the axis X-X'. It comprises on its external radial face a fluted portion 25 which cooperates with the output member 19.

The electrical machine 14 comprises a rotor 26 and a stator 27. The rotor 26 is disposed according to an axis Y-Y' parallel to the first axis X-X', away from this first axis X-X', and outside the clutch casing 21.

This electrical machine 14 has a shape elongated along the axis Y-Y' such that the length of the electrical machine 14, taken along the direction Y-Y', is higher than its diameter, taken along a direction perpendicular to the axis Y-Y'.

This disposition is particularly adapted to optimize the dimensions of the engine-transmission units which are transversally disposed with respect to a longitudinal direction of the vehicle.

Figure 2:
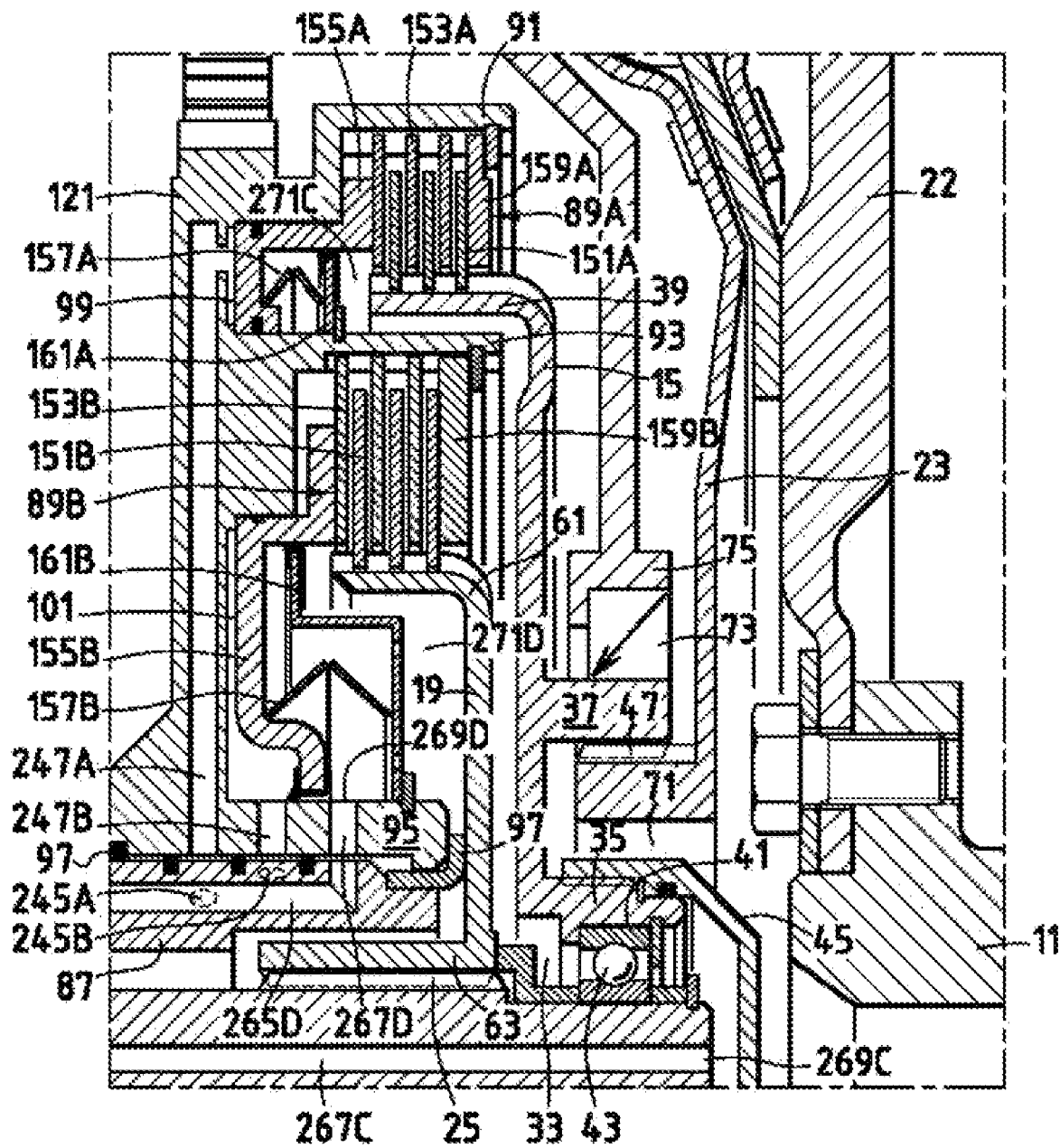
FIG. 2 is a view of a detail of FIG. 1.

As illustrated on FIG. 2, the input member 15 is in the shape of a disc which extend perpendicularly to the axis X-X'. A central bore 33 along the axis X-X' passes through it. It comprises first and second upstream rings 35 and 37 on the upstream face and a downstream ring 39 on the downstream face, which extend along directions parallel to the axis X-X'.

The upstream end of the gear box shaft 13 is positioned in the central bore 33. The first upstream ring 35 delimitates circumferentially this bore 33. The internal radial face of this first upstream ring is equipped with a circumferential housing 41.

The input member 15 is mounted free in rotation about the axis X-X' on the gear box shaft 13 by means of a rolling bearing 43 whose external ring is supported in the circumferential housing 41 and the internal ring is supported on the gear box shaft 13.

A sealing lid 45 is fixed in application on the external radial face of the first circumferential ring 35 to close the bore 33 on the upstream side.

The second upstream ring 37 comprises a fluted internal radial face 47 which cooperates with flutes on a facing external surface of the damping device 23 fixed to the flywheel 22 with which the crankshaft 11 is equipped.

The output member 19 is in the shape of a disc which extends perpendicularly to the axis X-X'. It comprises on its downstream face an external downstream ring 61 and an internal downstream ring 63 which extend according to directions parallel to the axis X-X'.

This internal downstream ring 63 is equipped on its internal radial face with flutes which cooperate with the fluted portion 25 of the gear box shaft 13, as described above.

By reference to FIG. 1, the clutch casing 21 is constituted essentially by a first half-shell 65 and by a second half-shell 67, assembled by fixation means (not shown) distributed on the periphery of the carter 21. The two casing half-shells 65 and 67 delimitate internally a housing 69.

A central bore 71 passes through the first half-shell 65 along the axis X-X'. By reference to FIG. 2, the first and second upstream rings 35 and 37 of the input member 15, as well as the upstream end of the gear box shaft 13, protrude into this bore 71.

Further, a gasket 73 is mounted in application, on the one hand, on the external face of the second upstream ring 37 of the input member 15, and on the other hand, in a circumferential housing 75 of the first half-shell 65.

By reference to FIG. 1, a bore 77 passes through the second half-shell 67 along the axis X-X', the gear box shaft 13 being mounted movable in rotation about the axis X-X' via a rolling bearing 79 in this bore.

Further, the second half-shell is equipped with a sleeve 81 through which a bore along Y-Y' passes.

The housing 69 defined by the two half-shells 65 and 67 contains an intermediate member 83, a coupling member 85 to the rotor 26 of the electrical machine 14, a hydraulic distributor 87, a first clutch 89A between the input member 15 and the intermediate member 83, and a second clutch 89B between the intermediate member 83 and the output member 19.

The intermediate member 83 is formed essentially by a hub. As illustrated on FIG. 2, the upstream face of this member 83 comprises successively, along a radial direction from the outside toward the axis X-X', an external upstream ring 91, an internal upstream ring, and a support ring 95, which extend parallel to the axial direction toward the upstream side.

The support ring 95 is supported on the hydraulic distributor 87 by means of two smooth bearings 97. Thus, the intermediate member 83 is mounted movable in rotation about the axis X-X' with respect to the hydraulic distributor 87.

This member 83 comprises further a first piston housing 99 which extends radially between the external ring 91 and the internal ring 93 and a second piston housing 101 which extends radially between the internal ring 93, and the support ring 95.

The intermediate member 83 comprises further on its external radial face a toothed tangential wheel 121 for linkage with the coupling member 85.

The coupling member 85 (FIG. 1) comprises a toothed wheel 123 mounted movable in rotation about the axis Y-Y' by means of rolling bearings 124 supported on the external radial faces of the sleeve 81.

The coupling member 85 comprises further an output shaft 127 mounted integral with the toothed wheel 123. A gasket 129 is disposed between this output shaft 127 and the sleeve 81. The output shaft 127 comprises further an upstream portion 130 outside of the sleeve 81.

The external radial surface of the upstream portion 130 of the output shaft 127 comprises a fluted zone.

This fluted zone cooperates with a fluted axial housing 133 in the rotor 26 such that the rotor 26 and the coupling member 85 are integral in rotation.

Further, the teeth of the toothed tangential wheel 123 of the coupling member 85 and of the toothed wheel 121 of the intermediate member 83 are in the same rotation plane, perpendicular to the axes X-X' and Y-Y'.

A chain 135 of the "morse" type, of which a first portion cooperates with the toothed wheel 123 of the coupling organ 85 and a second portion cooperates with the toothed tangential wheel 121 of the intermediate member 83, connects these parts in rotation.

The hydraulic distributor 87 is constituted by a sleeve which extends axially along the axis X-X'. the downstream base of this sleeve is blocked between the second half-shell 67 of the casing 21 and the gear box shaft 13. A double gasket 131 is disposed between this sleeve and the gear box shaft 13.

Further, this sleeve is fixed on the second half-shell 67 by means of screws 133.

As shown on FIG. 2, the first clutch 89A is constituted by a first series of discs 151A linked in rotation to the downstream ring 39 of the input member 15 by axial flutes and a second series of discs 153A linked in rotation to the external upstream ring 91 of the intermediate member 83 by axial flutes. It comprises further a first piston 155A and an elastic element 157A.

The first and second discs 151A and 153A are interleaved in an alternated manner and are movable axially on the downstream ring 39 of the input member 15 and on the external ring 91 of the intermediate member 83, respectively.

An upstream stop 159A, integral with the external ring 91 of the intermediate member 83, limits the axial displacement of the first and second discs 151A and 153A toward the upstream side.

The first piston 155A has a first support surface on the second series of discs 153A and a second support surface facing the bottom of the first housing 99. The first piston 155A closes the first housing 99 in a sealed manner.

The elastic element 157A is supported, on the one hand, on a surface of the piston opposite the second surface, and on the other hand, on a support 161A integral with the internal ring 93 of the intermediate member 83.

At rest, the elastic element 157A, constituted, for example, by a helical spring, or a diaphragm, or an elastic washer, maintains the second support surface of the first piston 155A in contact with the bottom of the housing 99. The first clutch 89A is thus naturally in open position, i.e., in unclutched position.

This clutch 89A is of the "wet" type. The first piston 155A is movable by axial sliding toward the upstream when the control fluid which flows into the first housing 99 applies a hydraulic pressure on the piston 155A.

This displacement makes it possible to tighten in an integral manner the first and second discs 151A and 153A between the first surface of the first piston 155A and the stop 159A, so that the first clutch 89A can be in closed position, i.e., in engaged position.

The second clutch has a constitution and an operation identical to the first clutch 89A.

It comprises first and second series of discs 151B and 153B integral in rotation with the downstream ring 61 of the output member 19 and with the internal ring 93 of the intermediate member 83, respectively, by flutes.

It comprises also a stop 159B, a second piston 155B having a first contact surface with the second discs 153B and a second contact surface facing the bottom of the second housing 101, and an elastic element 157B.

The second piston 155B closes the second housing 101 in a sealed manner.

The elastic element 157B is supported, on the one hand, on a surface of the second piston 155B opposite its second surface, and on the other hand, on a support 161B integral with the support ring 95 of the intermediate member 83.

Like for the first clutch 89A, the elastic element 157B maintains, at rest, the second surface of the piston 155B in contact with the bottom of the housing 101, and consequently, the first and second discs 151B and 153B apart from each other. The second clutch 89B is thus naturally in open position, i.e., it is naturally in unclutched position.

Further, the second clutch 89B is of the "wet" type. The second piston 155B is movable axially toward the upstream side under the action of the pressure of the fluid which flows into the second housing 101, so that the second clutch 89B can be in closed position, i.e., engaged.

The first and second clutches 89A and 89B are mounted coaxially and concentrically, such that the dimensions of the transmission unit along the axis X-X' is minimal. This size is smaller or substantially equal to that of a standard clutch element of a mono-source drive vehicle.

Further, the first clutch 89A is disposed radially outside of the second clutch 89B.

Figure 3:
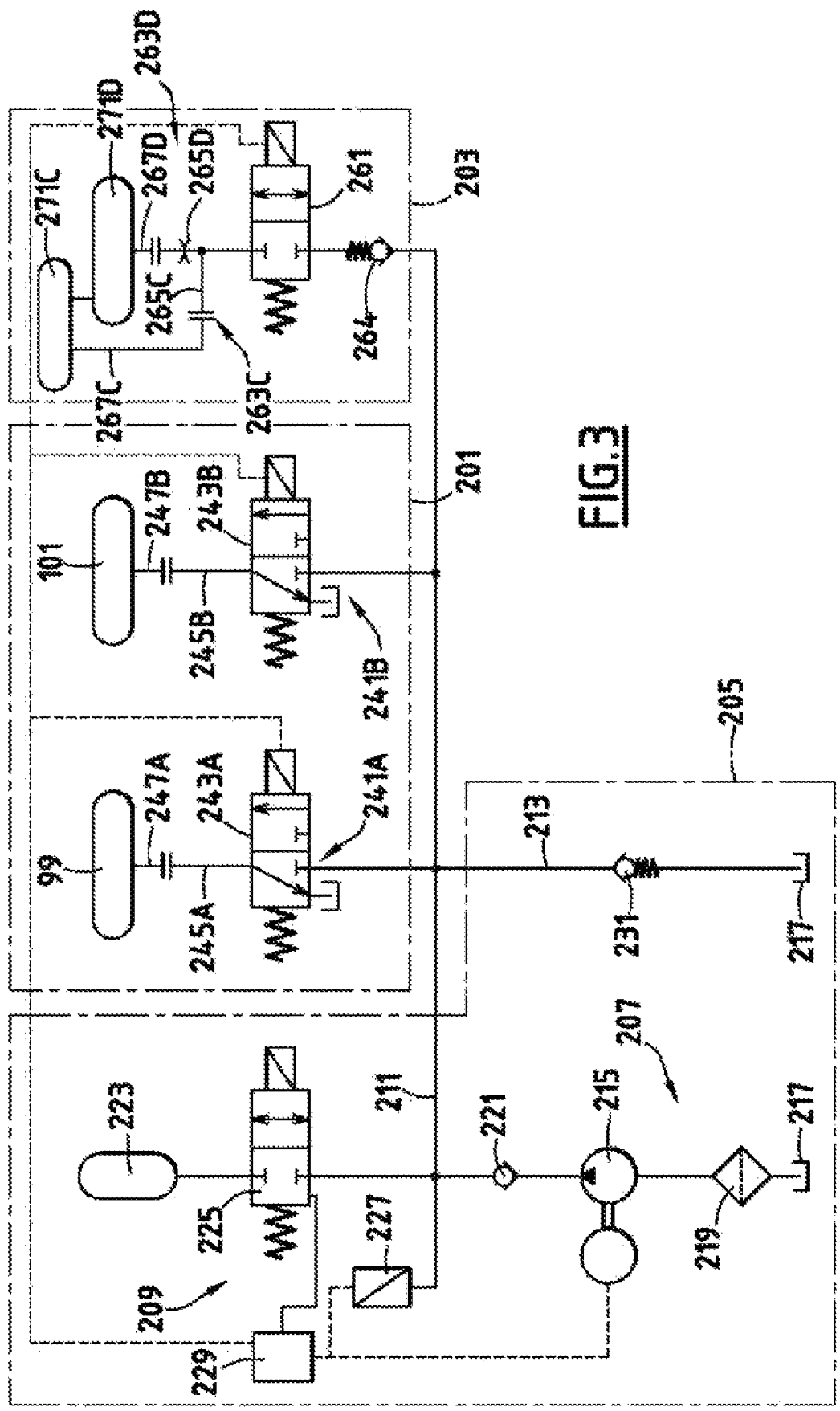
FIG. 3 is a schematic view of the hydraulic control and lubrication/cooling circuits of the transmission element according to the invention.

As shown on FIG. 3, the first and second clutches are controlled selectively, lubricated, and cooled by a pressurized fluid circulating through a first hydraulic control circuit 201 and a second hydraulic lubrication/cooling circuit 203 from a source 205 of pressurized fluid common to these two circuits 201 and 203.

This source 205 of pressurized fluid comprises a pressure generator 207, a pressure accumulator 209, an emission conduit 211 of pressurized fluid, and a discharge circuit 213.

The pressure generator 207 is constituted by a pump 215 whose input is connected hydraulically to a tank 217 of fluid. A filtration element 219 (designated by "strainer") is interposed between the tank 217 and the pump 215.

The output of the pump 215 is connected, on the one hand, to the pressure accumulator 209, and on the other hand, to the emission conduit 211. This output is equipped with a check valve 221 which prevents the pressurized fluid from being reintroduced into the pump 215. In the example shown on FIG. 3, the pressure of the fluid at the output of the pump 215 is substantially 40 bars, for a flow rate of 1.4 liters per minute. In this example, the clutches are dimensioned to transmit a maximal torque of 270 N.m.

The pressure accumulator 209 comprises a tank 223 of fluid and an electrovalve 225 for coupling with the pressure generator 207 and the emission conduit 211. This electrovalve 225 operates according to three modes.

In the receptor mode, the pressurized fluid circulates from the pressure generator 207 toward the tank 223 to recharge the tank 223 with pressurized fluid. In an emitter mode, the pressurized fluid circulates between the tank 223 and the emission conduit 211 to distribute pressurized fluid to the hydraulic circuits 201 and 203. Finally, in a neutral mode, the tank 223 is isolated from the emission conduit 211.

The emission conduit 211 is equipped with a pressure sensor 227. The sensor 227 is connected electrically to a control unit 229 of the electrovalve 225 of the pressure accumulator 209. When the pressure measured by the sensor 227 decreases below a threshold value, the control unit 229 actuates the electrovalve 225 to supply the emission conduit 211 with pressurized fluid from the accumulator 209.

Further, the control unit 229 is connected electrically to the motor of the pump 215 to actuate this pump 215 as a function of the pressure measured by the sensor 227. Thus, when the pressure in the conduit 211 decreases below a threshold value, the pump 215 is actuated and the electrovalve 225 is opened to recharge the pressure accumulator 209 with pressurized fluid.

Further, the emission conduit 211 is connected hydraulically to the discharge circuit 214. This discharge circuit 213 comprises a security valve 231 whose input is connected to the emission conduit 211 and whose output is connected to the tank 217. Beyond a predetermined tare value (43 bars in the example shown on the Figures), this valve 231 is opened and the pressurized fluid circulates from the emission conduit 211 to the tank 217 to reduce the pressure in this conduit 211 and in the first and second hydraulic circuits 201 and 203.

The first hydraulic control circuit 201 is connected hydraulically to the emission conduit 211. It comprises first and second circuits 241A and 241B for supply of pressurized fluid to the first and second housings 99 and 101, respectively, of the intermediate member 83.

The first supply circuit 241A comprises a control electrovalve 243A connected hydraulically to the emission conduit 211, a first channel 245A provided along a radial direction in the hydraulic distributor 87, and a second channel 247A provided along a radial direction in the intermediate member 83.

The first channel 245A comprises an input orifice connected to the output of the control electrovalve 243A and an output orifice which opens into the annular space between the hydraulic distributor 87 and the intermediate member 83 (FIG. 2).

The second channel 247A comprises an input orifice on the internal radial face of the support ring 95 facing the output orifice of the first channel 245A, and an output orifice which opens into the first piston housing 99.

The electrovalve 243A is driven by the control unit 229 to control the pressure in the piston housing 99 over a continuum of values in a predetermined range (for example, from 0 to 11 bars).

Thus, it is possible to drive the clutch 89A to obtain a progressive tightening of the discs 151A and 153A.

By reference to FIG. 3, the second supply circuit 241B comprises a control electrovalve 243B connected hydraulically to the emission conduit 211, a third channel 245B provided along a radial direction in the hydraulic distributor 87, and a fourth channel 247B provided along a radial direction in the intermediate member 83.

The third channel 245B comprises an input orifice connected to the output of the control electrovalve 243B and an output orifice which opens into the annular space between the hydraulic distributor 87 and the intermediate member 83 (FIG. 2). The third channel 245B is shifted radially with respect to the first channel 245A.

The fourth channel 247B comprises an input orifice on the internal radial face of the support ring 95 facing the output orifice of the third channel and an output orifice which opens into the second piston housing 101.

The electrovalve 243B is driven by the control unit to control the pressure in the piston housing 99 over a continuum of values in a predetermined range (for example, from 0 to 11 bars).

Thus, it is possible to drive the second clutch 89B to obtain a progressive tightening of the discs 151B and 153B.

By reference to FIG. 3, the lubrication/cooling circuit 203 comprises a control electrovalve 261 connected hydraulically to the emission conduit 211. This electrovalve 261 is of the "all or nothing" type, i.e., it has two operating modes, open or closed. Further, this circuit 203 comprises a first conduit 263C and a second conduit 263D.

A security valve 264 is interposed between the emission conduit 211 and the electrovalve 261. This valve 264 makes it possible to avoid, at the time of opening the electrovalve 261, a pressure drop in the emission conduit 211, and thus the sudden opening of one or the other of the two clutches 89A, 89B initially closed by the pressurization of the housings 99, 101 from the emission conduit 211.

The first conduit 263C comprises a fifth radial channel 265C. This fifth channel 265C is provided in the distributor 87. It connects hydraulically the output of the electrovalve 261 to a radial output orifice which opens into the annular space between the hydraulic distributor 87 and the gear box shaft 13 (FIG. 1).

The first conduit comprises further a sixth internal channel 267C along the axis X-X'. This sixth channel 267C is provided in the gear box shaft 13. It comprises a radial supply orifice on its external radial face, facing the radial output orifice of the fifth channel 265C, and an axial orifice 269C on the upstream axial face of this shaft 13 (FIG. 2).

Further, by reference to FIG. 3, the second conduit 263D comprises a seventh axial channel 265D. This channel 265D is provided in the hydraulic distributor 87 along a direction parallel to the axis X-X'. It connects hydraulically the fifth channel 265C to a radial output orifice into the annular space between the hydraulic distributor 87 and the intermediate member 83 (FIG. 2).

This second conduit 263D comprises further an eight internal radial channel 267D. This channel 267D is provided in the intermediate member 83. It comprises a radial supply orifice on the internal radial face of the support ring 95 facing the radial output orifice of the seventh axial channel 265D of the distributor 87. It comprises further an output orifice on the external radial face of the support ring 95. This output orifice 269D is shifted axially toward the upstream side with respect to the second piston housing 101.

When a cooling and lubrication cycle of the clutches 89A, 89B must be performed, the control unit 229 drives the pump 215 and opens the electrovalve 261.

The lubrication and the cooling of the first clutch 89A are ensured by the circulation of the fluid from the emission conduit 211, through successively the valve 264 if the pressure in said emission conduit 211 is higher than a predetermined tare value of the valve 264 (38 bars in the example shown on the Figures), the electrovalve 261 set in open position, the fifth channel 265C, the sixth channel 267C, the axial orifice 269C of the gear box shaft 13, then the bearing 43, until the first space 271C formed between the input member 15, and the output member 19, the intermediate member 83, and the first piston 155A, and finally through the discs 151A and 153A of the first clutch 89A.

The lubrication and the cooling of the second clutch 89B are ensured by the circulation of the fluid from the emission conduit 211, through successively the valve 264 if the pressure in the conduit 211 is higher than a predetermined tare value of the valve 264 (38 bars in the example shown on the Figures), the electrovalve 261 set in open position, the seventh channel 265D, the eight channel 267D, the output orifice 269D until the second space 271D delimited by the support ring 95 of the intermediate member 83, the second piston 155B, and the output member 19, and finally through the discs 151B and 153B of the second clutch 89B.

Further, the space 271D is in hydraulic communication with the space 271C via the second clutch 89B.

Further, the two casing half-shells 65 and 67, the sealing lid 45, the input member 15, the coupling member 85, and the gear box shaft 13 define a sealed housing 69 for the cooling and lubrication fluid.

The lubrication and the cooling of the transmission means constituted by the toothed wheel 123 of the coupling member 85, the morse chain 135, and the toothed wheel 121 of the intermediate member 83, are ensured by aspersion of the lubrication and cooling fluid which flows out of the first space 271C through the first and second discs 151A and 153A of the first clutch 89A.

For example, the operation of the transmission element according to the invention, when a motor vehicle according to the invention is started in movement, will be described.

In a first time period, the vehicle can be started in movement with the help of the electrical machine 14.

The electrovalve 243B is actuated to supply the second supply circuit 241B with pressurized fluid. By reference to FIG. 2, the fluid pressure in the third channel 245B of the hydraulic distributor 87, then in the fourth channel 247B of the intermediate member 83, and consequently in the second housing 101 of the second piston 155B, increases.

Under the effect of this pressure increase, a force is applied on the second surface of the second piston 155B. this force is higher than the return force of the elastic element 157B and the second piston 155B is moved axially toward the upstream side. The first and second discs 151B and 153B of the second clutch 89B are made progressively integral with each other, in accordance with the pressure in the housing 101 controlled by the control unit 229. Thus, the second clutch 89B is progressively closed or engaged.

An electric supply is provided to the stator 27 which drives in rotation the rotor 26 and consequently, the coupling member 85. This rotational movement is transmitted to the intermediate member 83 by the morse chain 135.

The second clutch 89B being closed, the rotational movement of the intermediate member 83 is transmitted to the output member 19. This output member 19 drives in rotation about the axis X-X' the gear box shaft 13 and consequently, if a gear is engaged, the wheels of the vehicle.

When the vehicle reaches a predetermined speed, the thermal engine can be started with the help of the electrical machine.

The electrovalve 243A is then actuated to supply the first supply circuit 241A with pressurized fluid. By reference to FIG. 2, the fluid pressure in the first channel 245A of the hydraulic distributor 87, then in the second channel 247A of the intermediate member 83, and consequently in the first housing 99 of the first piston 155A, increases.

Under the effect of this pressure increase, a force is applied on the second surface of the first piston 155A. This force is higher than the return force of the elastic element 157A. The first piston 155A then moves axially toward the upstream.

Consequently, the first and second discs 151A and 153A are tightened progressively in accordance with the pressure in the housing 99 controlled by the external control unit 229 between the first surface of the first piston 155A and the stop 159A. Thus, the first clutch 89A is progressively closed or engaged.

The electrical machine 14 being still supplied, the movement in rotation of the intermediate member 83 is transmitted to the input member by the first clutch 89A.

The input member 15 drives in rotation the damping device 23, the flywheel 22, and consequently, the crankshaft 11 of the thermal engine.

When this engine has reached a sufficient engine speed, the injection and combustion of fuel in the pistons are started.

At that instant, the electric supply of the electrical machine 14 can be cut. The movement in rotation of the intermediate member 83 is transmitted to the coupling member 85 by the morse chain 135. This rotation of the coupling member drives in rotation the rotor 26 for a possible production of electric energy which is collected at the terminals of the stator 27.

During all these operations, the lubrication and the cooling of the first and second clutches 89A and 89B, as well as of the intermediate member 83, of the morse chain 135, and of the coupling member 85, are ensured by the circulation of a lubrication and cooling fluid through the electrovalve 261, and the first and second conduits 263C and 263D as described above.

Further, the input member 15, the first and second clutches 89A and 89B, the intermediate member 83, the hydraulic distributor 87 and the output member 19 are part of a module arranged as a single unit in the housing 69 of the clutch casing 21. This casing 21 can be easily adapted on a transmission chain of a mono-source drive vehicle.

As a variant, the clutches 89A and 89B can both be naturally closed, i.e., naturally engaged, or one naturally closed and the other naturally open.

Thanks to the invention which has just been described, it is possible to obtain a particularly compact transmission element. This element makes it possible to install a traction chain of the parallel hybrid type on a vehicle with a standard configuration of the transmission, and conversely, without major modifications of the other elements of the traction chain, in particular of the thermal motor and of the gear box which stay in the same place.

This transmission element is available in the form of an independent module, arranged as one unit, which facilitates its assembly.

The invention claimed is:

1. Transmission element for a parallel hybrid traction chain, in particular for motor vehicles, said element comprising an input member movable in rotation, for connection to a thermal engine, a movement output member for connection to an input shaft of a gear box, an electrical machine comprising a stator and a rotor, a first connecting clutch between the input member and an intermediate member movable in rotation about a first axis, the intermediate member being connected in rotation to the rotor, a second connecting clutch between the intermediate member and the output member, wherein the transmission element comprises a casing comprising a first half-shell supporting the input member movable in rotation and a second half shell supporting the gear box shaft movable in rotation, the first and second half shells defining a housing in which the first and second connecting clutches are mounted coaxially and concentrically, in that the rotation axis of the rotor is distinct from the first axis, and in that the transmission element connects in rotation the rotor and the intermediate member.

2. Transmission element according to claim 1, wherein the rotation axis of the rotor is parallel to said first axis.

3. Transmission element according to claim 2, wherein the electrical machine has a shape elongated along the rotation axis of the rotor.

4. Transmission element according to claim 1, wherein the electrical machine is outside of said housing and the rotor is integral in rotation with a coupling member in said housing.

5. Transmission element according to claim 3, wherein the transmission means comprise a first toothed wheel integral with a radial surface of the coupling member, a second toothed wheel integral with a radial surface of the intermediate member, and a transmission chain which connects the first and second toothed wheels.

6. Transmission element according to claim 1, wherein the intermediate member is in the shape of a hub extending perpendicularly to the first axis, this hub comprising, on an upstream face, an external axial ring in rotational linkage with the first clutch, an internal axial ring in rotational linkage with the second clutch, this hub being mounted movable in rotation about the first axis on a distributor fixed to the casing.

7. Transmission element according to claim 1, wherein the input member is formed by a disc extending perpendicularly to the first axis, this disc comprising, on an upstream face, an upstream axial ring equipped with flutes for linkage with a damping flywheel connected to the thermal engine, and on a downstream face, a downstream axial ring in rotational linkage with the first clutch.

8. Transmission element according to claim 1, wherein the output member is formed by a disc extending perpendicularly to the first axis, this disc comprising, on a downstream face, an internal axial ring equipped with flutes for linkage with a gear box input shaft, and an external axial ring in rotational linkage with the second clutch.

9. Transmission element according to claim 1, wherein the input member, the first and second clutches, the intermediate member, and the output member are part of a module arranged as one unit in the housing.

10. Transmission element according to claim 1, wherein the first and second clutches are wet clutches, the housing being closed in a sealed manner with respect to a lubrication and cooling fluid.

11. Transmission element according to claim 10, wherein the first clutch comprises a first series of discs in rotational linkage with the input member and a second series of discs in rotational linkage with the intermediate member, the discs of this second series being disposed between the discs of the first series, the first and second series of discs being movable in axial translation under the action of an actuating piston disposed in a housing of the intermediate member.

12. Transmission element according to claim 10, wherein the second clutch comprises a first series of discs in rotational linkage with the intermediate member and a second series of discs in rotational linkage with the output member, the discs of the second series being disposed between the discs of the first series, the first and second series of discs being movable in axial translation under the action of an actuating piston disposed in a housing of the intermediate member.

13. Transmission element according to claim 10, wherein the first and second clutches comprise each a return member in open position of these clutches.

14. Transmission element according to claim 10, which comprises further a hydraulic circuit for selective control of the closing of the first and second clutches.

15. Motor vehicle comprising a parallel hybrid traction chain, said traction chain comprising a thermal engine, a gear box, and a transmission element according to claim 1 connecting the thermal engine and the gear box.

* * * * *